(No Model.)
J. T. HOUCHENS.
CAR STARTER.
No. 247,645. Patented Sept. 27, 1881.
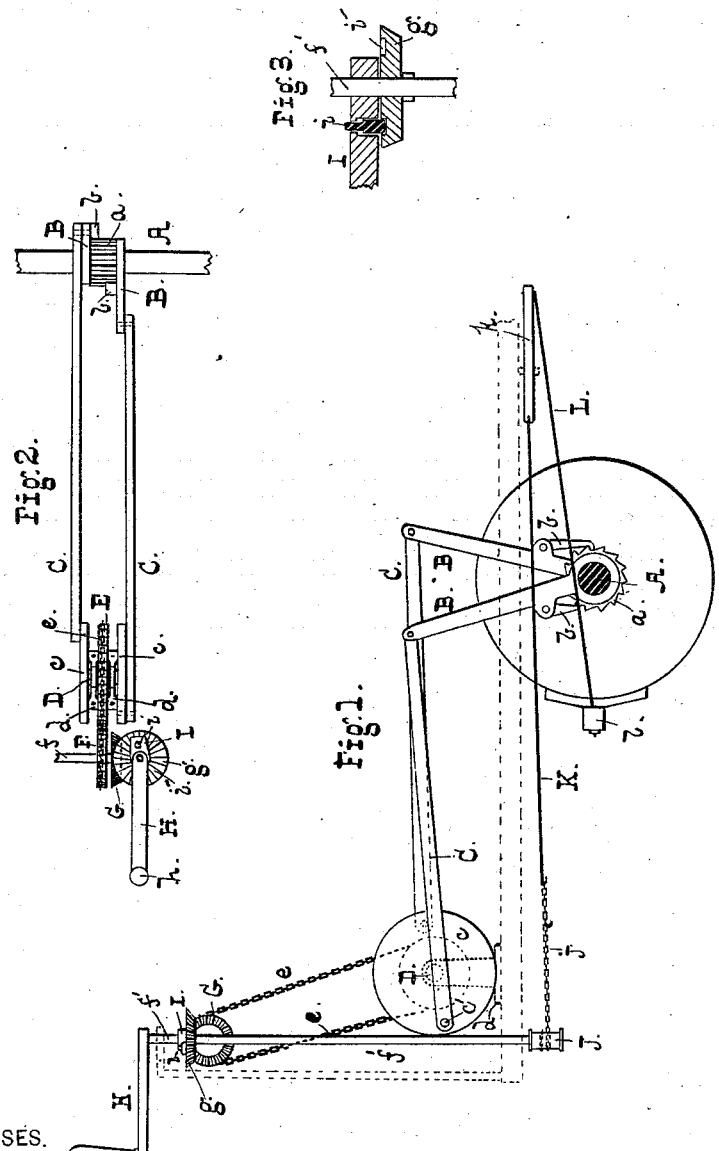
WITNESSES.
INVENTOR
J. T. Houchens.
BY
A. W. Williams
ATTORNEY.

UNITED STATES PATENT OFFICE.

JOHN T. HOUCHENS, OF BALTIMORE, MARYLAND, ASSIGNOR OF ONE-HALF TO ISAAC H. WRIGHT, OF SAME PLACE.

CAR-STARTER.

SPECIFICATION forming part of Letters Patent No. 247,645, dated September 27, 1881.

Application filed August 22, 1881. (No model.)

*To all whom it may concern:*

Be it known that I, JOHN T. HOUCHENS, of Baltimore city, State of Maryland, have invented certain new and useful Improvements in Car-Starters; and I hereby declare the same to be fully, clearly, and exactly described as follows, reference being had to the accompanying drawings, in which—

Figure 1 is a side elevation of the device; Fig. 2, a top plan of the same, and Fig. 3 a sectional view of the gear and ratchet wheel upon the crank-shaft.

My invention relates to devices for facilitating the starting of street-cars, and in particular to that class of the same in which the rotation of the wheels in starting is effected by a ratchet-and-pawl attachment upon the axle.

My invention consists, first, in a car-starter embodying a mechanism for effecting a forward rotation of one or both axles, so combined with the crank-shaft of the brake that its rotation in one direction will apply the brakes to the wheels, while its opposite rotation turns the axle to set the car in motion, the starting mechanism being also connected with the axle in such manner that the wheels are susceptible of being locked against reverse rotation, and are always free to turn forward, except when the brakes are applied.

My invention consists, secondly, in certain features of construction and combinations of parts, as hereinafter set forth and claimed.

In the drawings, A is the axle, upon which is keyed a ratchet, a. On either side of the ratchet a lever, B, is pivoted upon the axle, having each a pawl, b, that engages with the ratchet. Rods C connect the upper ends of the levers B with crank-pins c' upon disks c, which latter are mounted upon a shaft, D. Intermediate the disks is a sprocket-wheel, E, over which a chain, e, is led to the wheel F on a horizontal shaft, f. The shaft D is mounted in stanchions or uprights d, bolted to the floor of the platform. On the shaft f is a bevel-wheel, G, which meshes with a similar wheel, g, loosely mounted upon the crank-shaft f'. A boss, I, is keyed upon the shaft f' immediately above the wheel g, and carries a gravity or spring latch, i, that engages with a ratchet, i', on the upper face of the wheel g. (See Fig. 3.) H is the usual crank, having a handle, h, and J is the drum on the lower end of the shaft f', around which the chain j of the brake-rod K is wound. This rod is connected in the usual way to the lever k, from the opposite end of which a rod, L, leads to the brake-beam l.

In operation the car is stopped by applying the brakes, the boss I simply turning upon the ratchet of the wheel g. As the car comes to rest the pawls b fall into engagement with the ratchet a and lock the axle against reverse rotation, when the brakes may, if desired, be released, if the car is on a level or an up-grade. In starting the car the brake-crank is turned in the opposite direction, the spring of the brake-beams and connections materially assisting and causing the wheels g, G, and F to turn. This motion is communicated through the medium of the sprocket-chain to the disks c, rocking the levers B back and forth. On the forward stroke of each lever the pawl engages with the ratchet and the axle is turned. The pawls b are arranged, as shown in Fig. 1, so that one shall push and the other pull upon the ratchet, whereby, upon rocking the levers to their full distance, the pulling-pawl being to the rear, both pawls fall by gravity out of engagement with the ratchet, and the clicking which would otherwise result while the car is in motion is prevented.

I do not limit myself to the precise construction shown, as the device may be varied in many ways without departing from the spirit of my invention. The disks may, for instance, be replaced by cranks on the shaft D, and the power-crank may be applied directly to the horizontal shaft f.

What I claim as new, and desire to secure by Letters Patent, is—

1. In a car-starter, the combination, substantially as set forth, of a ratchet and pawl adapted to enforce the rotation of the wheels with the hand-brake mechanism, whereby the rotation of the crank in one direction sets the brakes and in the other releases them and turns the axle.

2. In combination with the axle having a ratchet, pawl, and lever, as set forth, the hand-brake shaft provided with gearing for rocking the said lever and effecting thereby the rotation of the axle.

3. In combination with the hand-brake shaft and sprocket-chain e, the rocking levers B, ratchet a, and pawls b, and intermediate mechanism, whereby the rotation of the brake-crank in releasing the brakes effects the rotation of the axle, as set forth.

4. In combination with the brake-shaft having the loose wheel g and the pawl i, the wheels G, F, and E, chain e, and mechanism for rocking the levers B, whereby, on the forward strokes, the pawls are made to engage with the ratchet, as set forth.

JOHN T. HOUCHENS.

Witnesses:
R. D. WILLIAMS,
C. W. SNEIDER.